United States Patent [19]

Kaminaka et al.

[11] 3,714,268
[45] Jan. 30, 1973

[54] PROCESS FOR PRODUCING GRANULATED FREE-FLOWING 2,6-DITERTIARYBUTYL-4-METHYLPHENOL

[75] Inventors: Hiroshi Kaminaka, Toyonaka-shi; Takashi Tamura, Ibaraki-shi; Kenji Tanimoto, Minoo-shi, all of Japan

[73] Assignee: Sumitomo Chemical Company, Ltd., Osaka, Japan

[22] Filed: Jan. 13, 1970

[21] Appl. No.: 2,673

Related U.S. Application Data

[63] Continuation-in-part of Ser. No. 561,004, June 28, 1966, abandoned.

[52] U.S. Cl. ............................ 260/624 R, 260/624 A
[51] Int. Cl. ............................................... C07c 39/06
[58] Field of Search ...................... 260/624 R, 624 A

[56] References Cited

UNITED STATES PATENTS

| | | | |
|---|---|---|---|
| 2,499,236 | 2/1950 | Van Gilder et al. | 260/624 |
| 2,969,401 | 1/1961 | Young et al. | 260/624 |
| 3,019,269 | 1/1962 | Clough | 260/620 |

*Primary Examiner*—Bernard Helfin
*Assistant Examiner*—Werren Brathaniel Lone
*Attorney*—Stevens, Davis, Miller and Mosher

[57] ABSTRACT

A process for granulating 2,6-ditertiarybutyl-4-methylphenol, which comprises recrystallizing 2,6-ditertiarybutyl-4-methylphenol from a mixture of water and at least one organic solvent of hexane, cyclohexane, heptane, octane, isooctane, petroleum ether, petroleum benzine and ligroin in the presence of an ethylene oxide adduct of nonylphenol, thereby obtaining a granular product having a better inter-granular slidability, excellent flowability and lower static chargeability than the starting 2,6-ditertiarybutyl-4-methylphenol.

3 Claims, No Drawings

PROCESS FOR PRODUCING GRANULATED FREE-FLOWING 2,6-DITERTIARYBUTYL-4-METHYLPHENOL

This application is a continuation-in-part of application Ser. No. 561,004, filed June 28, 1966 now abandoned.

The present invention relates to a process for granulating 2,6-ditertiarybutyl-4-methylphenol.

2,6-ditertiarybutyl-4-methylphenol is an important industrial chemical which is widely used as a non-coloring antioxidant for rubber and synthetic resin, as an antioxidant additive for petroleum products such as gasoline and lubricants, and as the inhibiting agent against degeneration of edible oils, dairy products, medicines and agricultural chemicals.

This compound, 2,6-ditertiarybutyl-4-methylphenol, is a white solid having a melting point of about 70°C., and is commercially produced by dibutylating para-cresol or by methylating 2,6-ditertiary butylphenol. It is prepared and distributed industrially in several forms, including powders, scale-like flakes, and granular crystals, all of which have substantially equal purity and are equally useful as antioxidant.

Recently, due to the development of automated and continuous process and automation processes in industries using this compound for such purposes, it is necessary that 2,6-ditertiarybutyl-4-methylphenol be continuously charged at a constant rate into a blender to mix with a matter to be inhibited from oxidation and degeneration. In the continuously charging process, the powder is prone to adhere to the wall of the vessel, to collect as clumps or it forms dust and lacks in flowability. It is likewise difficult to continuously charge the flake form at a constant rate since the flakes themselves are non-uniform in size and mass and do not flow readily by gravity.

The granular form heretofore available likewise does not feed satisfactorily in these operations since the crystals have sharp points which increase friction and otherwise retard flowability.

In addition, all forms heretofore known develop substantial electrical charges in handling and feeding which seriously retard flowability and present substantial hazards of fires and explosions.

There is, accordingly, a great need for a granular, crystalline product, the particles of which do not tend to adhere to themselves or to contacting surfaces from friction or electrical charges and have improved flowability so as to be adaptable to continuous weighing and charging operations.

One object of the present invention is to provide a process for treating 2,6-ditertiarybutyl-4-methylphenol in its conventional pulverulent, flaky and crystalline forms to convert the same to a novel granular form which is free-flowing and does not build up significant electrical charges.

Other objects will be apparent from the following description.

In order to accomplish these objects the present invention provides a process for converting such 2,6-ditertiarybutyl-4-methylphenol to the desired particulate form which comprises recrystallizing the compound from a mixture of water and at least one hydrocarbon from the group consisting of hexane, cyclohexane, heptane, octane, isoctane, petroleum ether, petroleum benzine and ligroin in the presence of a surface active agent.

In carrying out the present process, the starting material is 2,6-ditertiarybutyl-4-methylphenol preferably having purity not lower than 99 percent and which has been prepared by dibutylating para-cresol or by methylating 2,6-ditertiarybutylphenol and purifying by means of rectification or recrystallization, in the known manner.

For a better understanding of the present invention, characteristic features will now be explained. Flowability of a product is measured by determining the minimum angle of inclination to the horizontal of the surface over which the product easily flows down under gravitational forces without addition of external power. When precisely observing such a product, the following facts have been discovered. That is, in a product having excellent flowability the particle size is about 0.1 to about 3 mm diameter and the particles are substantially spherical with no pronounced angular projections, and transparent. The fact that the surfaces of the particles are substantially rounded reduces friction between each particle and inhibits adhering between particles. This is considered to be an important factor for the increase of the flowability.

In the known methods for producing round particles of the crystals of 2,6-ditertiarybutyl-4-methylphenol, one procedure comprises crystallizing 2,6-ditertiarybutyl-4-methylphenol from a suitable solvent, heating the thus-obtained crystals substantially to the melting point, or blowing hot air against the crystals thereby melting the surface of the crystals for a short period of time and then cooling the crystals to solidify them. However, in such operation, a slight increase of the temperature of prolongation of the heating period causes complete melting of the crystals or fusion at contacting surfaces and therefore extremely close controls of the heating period and the temperature are necessary to accomplish the purpose. Accordingly, as a practical matter it is scarcely possible to apply such procedures to the treatment of the substantial amounts of the product which is necessary on an industrial scale.

Alternate methods involving recrystallization from a suitable solvent have been proposed. As the recrystallization solvent, lower alcohols such as methanol, ethanol and isopropanol and their aqueous solutions may be used. In spite of the fact that such solvents possess good properties for the purification of 2,6-diteriarybutyl-4-methylphenol, only regular octahedron crystals are produced. When aromatic solvents such as benzene and toluene are used as the recrystallization solvent, the results also are unsatisfactory in that the purity of the product is not high, and the yield is quite low, only about 50 percent of the starting material being obtained as the product with the greater part of the starting material remaining in solution, although the shapes of the crystals were considerably improved.

Applicants have carried out studies using aliphatic solvents such as hexane, cyclohexane, heptane, octane and isooctane, and obtained satisfactory results in regard to the shape of the crystals and the flowability, but static chargeability remained a serious problem. Upon further research, it was found that petroleum ether, petroleum benzine or ligroin which consists chiefly of aliphatic hydrocarbons having six to eight carbon atoms gave the same result as that obtained from the use of hexane, cyclohexane, heptane, octane or isooctane each alone.

However, there was the further complication that the solubilities of 2,6-ditertiarybutyl-4-methylphenol in these solvents are very high, and a very high proportion of the starting 2,6-ditertiary-butyl-4-methylphenol remained dissolved in the solvent. Accordingly, only about 60 percent of the granular crystals based on the 4-methylphenol of the starting material were obtained as compared to the yield when employing aromatic solvents. If the amount of 2,6-ditertiarybutyl-4-methylphenol in the feed is increased in order to increase the amount of the product to be taken out in a single recrystallization step, the solution becomes a slurry and the treatment becomes difficult. After further studies and researches, the inventors have discovered that these problems can be solved and a satisfactory result obtained when the recrystallization is conducted in a solvent medium of water mixed with an aliphatic solvent such as hexane or petroleum benzine in the presence of a surface active agent. More specifically, 2,6-ditertiarybutyl-4-methylphenol is dissolved in a small amount of an aliphatic hydrocarbon solvent such as hexane, water and a surface active agent are added thereto and then the mixture is heated up to a temperature of from 70° to 80°C to dissolve 2,6-ditertiarybutyl-4-methylphenol completely in the solvent mixture. The resulting solution is cooled slowly with stirring to a temperature of from 0° to 30°C., whereupon the 2,6-ditertiarybutyl-4-methylphenol crystallizes from the solvent and these crystals are then collected by filtration, washed with water and dried to yield the objective product.

The thus-obtained crystals are spherical, colorless and transparent granules having a diameter of 0.1-1 mm with excellent flowability. The yield in a one-step recrystallization process is 90-95 percent, and a greater part of the starting material can be taken out as the product. Further, when the waste solvent is recycled and used to dissolve a second batch of 2,6-ditertiarybutyl-4-methylphenol for a succeeding recrystallization, the over-all yield is quantitative excepting handling losses.

The process of the present invention well utilizes the reverse properties in that 2,6-ditertiarybutyl-4-methylphenol is insoluble in water while it is very soluble in the aliphatic hydrocarbon such as hexane and petroleum benzine. The solution of 2,6-ditertiarybutyl-4-methylphenol in an aliphatic hydrocarbon such as hexane and petroleum benzine is dispersed in water as a number of small spherical liquid beads having uniform diameters by the aid of a surface active agent. In the cooling procedure, the crystals grow from the liquid beads to yield the rounded granular crystals of 2,6-ditetiarybutyl-4-methylphenol.

The organic solvents employed in the process of the present invention are hexane, cyclohexane, heptane, octane, isooctane, petroleum ether, petroleum benzine and ligroin. Among which, those mainly consisting of aliphatic hydrocarbons having six to eight carbon atoms are especially suitable.

The amount of the solvent to be used is from one-twentieth to one-half preferably from one-tenth to one-fifth of the weight of 2,6-ditertiarybutyl-4-methylphenol.

The amount of water used for the recrystallization of 2,6-ditertiarybutyl-4-methylphenol is from a one-half to 2 times, preferably equivalent or 1.5 times, of the weight of 2,6-ditertiarybutyl-4-methylphenol.

The preferred surface active agents employed in the present process are an ethylene oxide adduct of nonylphenol having a Hydrophile-Lipophile Balance (HLB) of 7 to 16.

Other surface active agents such as ionic surface active agents, e.g., salts of alkylbenzenesulfonic acids or sulfates of higher alcohols, and nonionic surface active agents, e.g., higher alcohols, other alkyleneoxides adducts of alkylphenols and polyvinylalcohol, may be employable, but the above-mentioned ethylene oxide adduct of nonylphenol is most effective among them, Emulgen 905 (Kao Sekken K.K., Japan), Sorpol N-P.4 and Sorpol N-P.8 (Toho Kagaku Kogyo K.K., Japan).

The amount of the surface active agent is within a range of from 0.001 percent to 0.1 percent, preferably 0.01 percent, by weight based on the 2.6-ditertiarybutyl-4-methylphenol.

If desired, a color-inhibitor such as citric acid may be present in the solution during the recrystallization without interfering therewith.

In addition to improved flowability, there is a further and unexpected advantage in the new product in that when these granules are shaken in a vessel, they develop only a slight electrical charge, that is, they do not adhere to the wall of the vessel and do not repulse each other. This phenomenon may be attributable to the use of a surface active agent or to the form of the crystals or possibly the combination.

The development of electrical charges on 2,6-ditertiarybutyl-4-methylphenol for example, at a transfer, apparently is caused by rubbing of the particles against each other or against the wall of the apparatus. The resulting charge, in turn, causes adhesion of the particles to the surfaces of the equipment or causes the dispersion of the particles from the vessel by the repulsion of the particles from each other or from the surfaces of the equipment in some instances.

This development of electrical charges interferes with various operations in factories and industrial plants, more especially in connection with automatic weighing and continuous charging of the 2,6-ditertiarybutyl-4-methylphenol. Furthermore, the phenomena presents hazards of fires and explosions. Accordingly, a product low in chargeability is desired industrially.

A comparison of the 2,6-ditertiarybutyl-4-methylphenol heretofore available on the market and the granulated 2,6-ditertiarybutyl-4-methylphenol product of this invention showed that almost all of the known substances develop an electrical charge under like conditions which is from several times to several tens times as much as the charge developed by this new product.

It will be apparent that the process of this invention whereby it is possible to obtain 2,6-ditertiarybutyl-4-methylphenol having superior flowability and low chargeability, is quite significant for industrial purposes.

The following examples are presented to more fully explain the present invention and should not be considered to limit the invention to the specific details set forth therein. Unless otherwise indicated, all parts are by weight.

EXAMPLE 1

One hundred parts of 2,6-ditertiarybutyl-4-methylphenol was dissolved in 20 parts of ligroin and 0.01 part of a surface active agent (ethylene oxide adduct of nonylphenol having HLB14 and 100 parts of water was added to the solution, and then the mixture was heated to 70°C. with stirring. The mixture was cooled slowly, as a result crystals formed and separated from the solution.

After the mixture was cooled down to 5°C. the separated crystals of 2,6-ditertiarybutyl-4-methylphenol were collected by filtration, washed with water and then dried, to yield 91 parts of the product. This product was in the form of colorless transparent rounded granular crystals which were of 0.1 mm to 1 mm in diameter and its flowability was superior to that of the starting material. This product, placed in a vessel made of glass, polyethylene or paper, flowed freely by gravity out of the vessel without application of any external force and did not adhere to the wall of the vessel when the vessel was inclined. The chargeability of this product was determined as described in Example 3.

Another batch of starting 2,6-ditertiarybutyl-4-methylphenol was dissolved and recrystallized in the same way using petroleum ether or petroleum benzine instead of ligroin. The recovered product was similarly free-flowing and non-adherent to the vessel. The starting 2,6-ditertiarybutyl-4-methylphenol was a commercial product of regular octahedron or similar form having particle sizes of 0.5–3 mm. made by Bayer AG, Germany.

EXAMPLE 2

One hundred parts of 2,6-detertiarybutyl-4-methylphenol were dissolved in 10 parts of isooctane, and 0.01 part of a surface active agent (ethylene oxide adduct of nonylphenol having HLB10) and 100 parts of water were added to the mixture, and then the mixture was heated in the range of from 70° to 80°C. with stirring.

The mixture was cooled slowly, as a result colorless and transparent rounded granular crystals formed and were separated from the solvent mixture. After further cooling the mixture to about 0°C. the separated crystals were collected by filtration, washed with water and dried, to yield 94 parts of the granular 2,6-ditertiarybutyl-4-methylphenol product. The flowability, the granule diameter and the electrification of the product were substantially the same as those of the product of Example 1.

The filtrate was easily separated and the recovered isooctane layer was reused for a succeeding recrystallization process.

The starting 2,6-ditertiarybutyl-4-methylphenol was a commercial product in the granular form having particle sizes of 2 mm or under, made by Shell Chemical Co., USA.

EXAMPLE 3

The electrification properties of the granular products of Examples 1 and 2, and their starting commercial forms and of three other samples of conventional 2,6-ditertiarybutyl-4-methylphenols were determined by measuring the electrical charge developed when a 30 gram sample in a 100 ml. glass vessel was shaken for 5 minutes on a laboratory automatic shaker.

At the conclusion of this treatment it was noted that, except for the products of this invention, the particles of the other samples of 2,6-ditertiarybutyl-4-methyphenol violently repulsed each other but strongly adhered to the vessel wall.

Thirty g. of 2,6-ditertiarybutyl-4-methylphenol was placed in a dried glass vessel having a capacity of 100 c.c. and subjected to shaking for 5 minutes by an automatic shaker. Then, 2,6-ditertiarybutyl-4-methylphenol was quickly spread on a dried paper to a thickness of 5 mm, and a quantity of electricity was measured by a FS type Statiscope provided over the paper at a height of 1 cm. The unit was in coulomb/cm$^2$.

The results of this test are set forth in the following table:

| Sample | Form | Electrical Charge |
|---|---|---|
| | | (relative values) |
| Ex. 1(a) Starting material (Bayer, Germany | regular octahedron or similar form Size : 0.5–3 mm | 18 |
| (b) Product | rounded granules 0.1–1 mm. | 1 |
| Ex. 2(a) Starting material (Shell Chemical, USA) | granular form Size : 2 mm or under | 5 |
| (b) Product | rounded granules 0.1–1 mm. | 1 |
| C–Takeda Yakuhin Kogyo K.K., Japan | Powders Sizes : 0.1 mm or under | 24 |
| D–Maruzen Oil Co. Japan | granular form Size : 0.1–2 mm | 12 |
| E–ICI, England | granular form Size : 0.1–3 mm | 6 |

It will be apparent from the foregoing results that the present invention produces a granular form of 2,6-ditertiarybutyl-4-methylphenol which has an electrical chargeability from one-fifth to one twenty-fourth that of the starting 2,6-ditertiarybutyl-4-methylphenol as well as other conventionally -produced commercially-available forms.

What is claimed is:

1. A process for granulating, increasing the flowability, and decreasing the electrostatic chargeability of 2,6-ditertiarybutyl-4-methylphenol, which comprises dissolving pulverulent, flaky, or crystalline 2,6-ditertiarybutyl-4-methylphenol in a solvent mixture consisting of water in an amount of one-half – 2 times by weight that of said 2,6-ditertiarybutyl-4-methylphenol and at least one organic solvent selected from the group consisting of hexane, cyclohexane, heptane, octane, isooctane, petroleum ether, petroleum benzine and ligroin in an amount of one-tenth to one-half times by weight that of said 2,6-ditertiarybutyl-4-methylphenol in the presence of 0.001 to 0.1 percent by weight of an ethylene oxide adduct of nonylphenol having a Hydrophile-Lipophile Balance of 7 to 16 on the basis of 2,6-ditertiarybutyl-4-methylphenol by heating to 70° to 80°C., cooling the solution to 0° to 30°C., whereby 2,6-ditertiarybutyl-4-methylphenol crystallizes out as transparent granules having only smoothly curved surfaces, and recovering the granular product.

2. A method according to claim 1 wherein the solvent mixture contains as the surfactant 0.01 part by weight of ethylene oxide adduct of nonylphenol having a Hydrophile-lipophile Balance of 14, and the organic solvent is ligroin.

3. A method according to claim 1 wherein the organic solvent is isooctane and the solvent mixture contains as the surfactant 0.01 part by weight of the ethylene oxide adduct of nonylphenol having a Hydrophile-Lipophile Balance of 10.

* * * * *